United States Patent
Wang et al.

(10) Patent No.: US 6,507,673 B1
(45) Date of Patent: Jan. 14, 2003

(54) METHOD AND APPARATUS FOR VIDEO ENCODING DECISION

(75) Inventors: Ren-Yuh Wang, Cupertino, CA (US); Yi-Yung Jeng, San Jose, CA (US)

(73) Assignee: Divio, Inc., Sunnyvale, CA (US)

( * ) Notice: Subject to any disclaimer, the term of this patent is extended or adjusted under 35 U.S.C. 154(b) by 0 days.

(21) Appl. No.: 09/263,601

(22) Filed: Mar. 5, 1999

Related U.S. Application Data

(60) Provisional application No. 60/077,190, filed on Mar. 6, 1998.

(51) Int. Cl.[7] .............................. G06K 9/36; G06K 9/46
(52) U.S. Cl. ............... 382/236; 375/240.02; 375/240.2; 382/239; 382/250
(58) Field of Search .............................. 382/232, 236, 382/239, 250; 375/240.02, 240.2, 240.13

(56) References Cited

U.S. PATENT DOCUMENTS

| | | | |
|---|---|---|---|
| 5,610,659 A | | 3/1997 | Maturi et al. ................. 348/42 |
| 5,832,234 A | * | 11/1998 | Iverson et al. ............... 709/247 |
| 5,874,996 A | * | 2/1999 | Shimokoriyama et al. ...................... 375/240.02 |
| 5,991,494 A | * | 11/1999 | Otsuka ......................... 386/37 |
| 6,023,266 A | * | 2/2000 | Eglit et al. ................... 345/555 |

OTHER PUBLICATIONS

P.H.N. de With, et al., Design Considerations Of The Video Compression System Of The New DV Camcorder Standard, Nov. 1997, IEEE Transactions on Consumer Electronics, vol. 43, No. 4, pp. 1160–1179.

* cited by examiner

*Primary Examiner*—Timothy M. Johnson
(74) *Attorney, Agent, or Firm*—Townsend and Townsend and Crew LLP

(57) ABSTRACT

New and improved apparatus and methods for video encoding, for example, to efficiently and concurrently encode video data into digital formats, such as Digital Video (DV) format. A pipelined system receives a block of video data and based on the computations and comparisons concurrently performed on the pixels within the block of video data determines which type of transformation is most appropriate for a given block of video data.

11 Claims, 8 Drawing Sheets

METHOD AND APPARATUS FOR VIDEO ENCODING DECISION

CROSS-REFERENCES TO RELATED APPLICATIONS

This application claims priority from Provisional Application No. 60/077,190, filed on Mar. 6, 1998, entitled "Method and Apparatus for Video Field Correlation," which is incorporated herein by reference in its entirety for all purposes.

BACKGROUND OF THE INVENTION

The present invention relates to the field of image processing. More specifically, the present invention relates to methods and apparatus for efficiently and concurrently applying video encoding techniques to convert analog data into digital formats, such as Digital Video (DV) format. This technique is especially suited for widely-used image compression standards that integrate various algorithms into a compression system, such as the standards specified in the DV Standard (DV-SD or the "Blue Book"), which is included herein by reference in its entirety and for all purposes.

The DV format is quickly becoming the standard for many consumer electronic video devices. For example, DV format camcorders can now be found with more frequency and at more competitive prices than the conventional analog 8 mm and VHS camcorders. At the same time, DV camcorders provide advantages which are inherent to digital technology, such as high quality of video and sound, digital filtering, digital error correction, and the like. DV provides quality at or higher than the high-end of the conventional analog camcorders such as Hi-8 mm and S-VHS, with much added flexibility. Also, digital format data can be repeatedly copied without loss of quality.

In the DV standard, the compression ratio is expected to be around 5:1. This means that excessive truncations of redundant data are unnecessary and image quality will not be compromised as much as some other digital standards available on the market now. In order to maintain a constant compression ratio, the compression analysis can be performed on the image at its video segment level. Each image frame consists of 270 video segments under National Television System Committee (NTSC) standard. Each image consists of 324 under Phase Alternation System (PAL) standard. Each video segment consists of five (5) macro blocks and each macro block contains six (6) blocks of 8×8 pixels.

The DV standard utilizes the 8×8 blocks in performing compression (also known as, "frame" compression). This data is provided by digitizing an image frame by frame originally in analog format. The analog image signals can originate from cable TV, analog camcorders, video cassette recorders (VCR's), and other similar analog sources. After digitization and encoding, the signals representing the image can be utilized by digital devices.

A well known technique in the prior art for compression of digitized data is to apply discrete cosine transform (DCT) to a block of data to transform the data from the spatial domain to the frequency domain. The resulting coefficients in the frequency domain act as weighing factors corresponding to their respective cosine curve. For background part of the image data, coefficients corresponding to higher frequency data will have a lower value. Conversely, coefficients corresponding to lower frequency data will have a higher value.

The transformation from the spatial domain to the frequency domain, however, does not by itself compress the digital data. After digital data is transformed into the frequency domain, an adaptive quantization can be applied to compress the data. In particular, adaptive quantization truncates the coefficients corresponding to high frequency data, and in most cases to zero. In essence, adaptive quantization will compress an image by deleting the extreme details of an image.

In the DV standard, a user can choose from one of two kinds of DCT transforms. FIG. 1 illustrates the two options provided by the DV standard. Box 102 illustrates an 8×8 block of pixels. Even rows are identified by circles and labeled as rows 0, 2, 4, and 6. Odd rows in the box 102 are shown by X's and labeled as rows 1, 3, 5, and 7. Under the DV standard, the image block shown in the box 102 can be treated as two separate images. The separation is illustrated in FIG. 1 by boxes 104 and 106. Box 104 contains the image data from the even rows. Box 106 contains the image data from the odd rows. Under the DV standard, the DCT transformation can be applied to either the 8×8 block shown in the box 102 or individually to blocks of data in boxes 104 and 106. Application of compression to the blocks individually is also know as "field" compression. This feature of the DV standard improves the image quality, especially for the moving pictures.

For example, in some DV camcorders, a user can be given the choice of choosing which DCT-type transformation is applied to a given recording session. Different settings can be provided for sports events, still images, and the like. The sports mode can, for example, indicate that a user wants to capture images from a scene containing moving objects, whereas the still mode can indicate that a user is not going to be capturing images from a scene containing moving objects.

FIG. 2 illustrates an example of how selecting a 2×4×8 DCT-type versus an 8×8 DCT-type transformation will improve the quality of an image containing moving objects. Box 202 illustrates a video frame in accordance with the DV standard having a resolution of 720×480 for NTSC and 720×576 for PAL systems. Within the frame, an object 204 is shown and an arrow 206 illustrates the movement of the object 204. As a result of the movement, the object 204 will shift to a new location, such as shown in box 208. Again, the box 208 is a representation of the image having a 720×480 resolution. Box 210 is an exemplary illustration of what would happen to an image of the moving object 204 if an 8×8 DCT-type transformation were to be applied to the image of the moving object. As shown, the object 204 can be divided into objects 204A, 204B, 204C, and 204D. The image illustrated in the box 210 is merely illustrative and the amount of jaggedness of the object can be dependent upon many factors, such as the speed of the moving object 204, the rate at which the analog image is digitized, and the like.

Generally, for a flicker-free image quality, a video digitization device must be able to digitize at least thirty frames per second for NTSC and 25 frames per second for PAL. When dealing with frames containing moving objects, the 2×4×8 DCT-type transformation will provide a higher quality image because odd and even fields of an image are transformed separately. Because compression is applied separately to these fields, the outlines of a moving object will be less likely to be jagged in the DV format video. Therefore, it is advantageous to apply a 2×4×8 DCT-type transformation (also known as "field" transformation).

Conversely, an 8×8 DCT-type transformation is more advantageous with frames containing more still objects. One of these advantages is that a more efficient compression can be performed because the whole 8×8 block is considered when applying adaptive quantization. Also, as one would expect, applying 2×4×8 DCT-type transformation to a still image will provide less efficient compression and can lower image quality unnecessarily.

As a result, a technique is desirable wherein a decision can automatically be made whether to use an 8×8 DCT-type transformation or a 2×4×8 DCT-type transformation on an 8×8 block.

SUMMARY OF THE INVENTION

The present invention provides new and improved apparatus and methods for video encoding, for example, to efficiently and concurrently apply encoding techniques to convert analog data into digital formats, such as Digital Video (DV) format. A pipelined system receives a block of video data and based on the computations and comparisons performed on the pixels within the block of video data determines which type of transformation is most appropriate for a given block of video data. In an embodiment, the pipelined system performs selected operations in parallel to save time and increase speed.

In another embodiment, a method is provided for determining whether to apply a transformation to selected portions of an image individually. This embodiment determines sum of pixel values for pixels in the different portions under consideration. The difference between the sum values is determined and compared with a threshold value. If the determined difference is higher than the threshold value, the transformation is applied to the different portions of the image individually.

In yet another embodiment, a method is disclosed for determining whether to apply a transformation to selected portions of an image individually. The method determines a cross product of the first portion of the image and the second portion of the image. If the determined cross product is less than a threshold value, the transformation is applied to the different portions of the image individually.

In a further embodiment, an apparatus is disclosed for determining whether to apply a transformation to a selected portions of an image individually. A first adder calculates the sum of pixel values for all pixels in the selected portions of the image. A second adder is coupled to the first adder and determines a difference between the calculated sums. A comparator is coupled to the second adder and compares the determined difference with a threshold value. The apparatus applies the transformation to the selected portions of the image individually if the determined difference is higher than the threshold value.

For further understanding of the nature and advantages of the present invention, together with other embodiments, reference should be made to the ensuing detailed description taken in conjunction with the accompanying drawings.

DESCRIPTION OF THE SPECIFIC EMBODIMENTS

Figure 3:
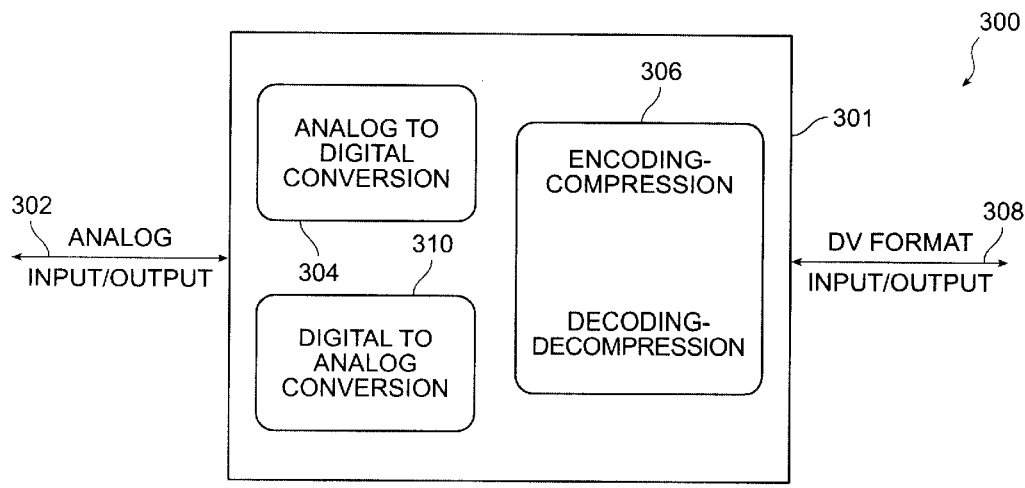
FIG. 3 illustrates a simplified block diagram of a system 300 in accordance with the present invention.

FIG. 3 illustrates a simplified block diagram of a system 300 in accordance with the present invention. Block 301 converts analog data into DV format data, and vice versa. Analog data is input and output at an analog node 302. DV data is input and output at a DV node 308. The analog signals can include those for cable TV, analog camcorders, video cassette recorders, and other analog sources. The DV format data can include those for digital DV camcorders, digital video editors, other DV format equipment, and other forms of storage such as memory in a PC, set atop boxes, WebTV®, and the like.

When converting analog data to DV format, an A/D converter 304 converts the analog data received at the analog node 302 to digital data. The digital data from the A/D converter 304 is then input into a coding-compression block 306 for encoding and/or compression. The encoded/compressed data is then output at the DV node 308 in DV format.

When converting DV format data to analog data, DV format data is input into block 301 at the DV node 308. The DV format data is then decoded and/or decompressed by the coding-compression block 306. The decoded/decompressed data is then received by D/A converter 310 which converts the digital data to analog and then outputs the analog data at the analog node 302. Alternatively, blocks 304 and 310 can be implemented on the same chip or onto two separate chips.

Figure 4:
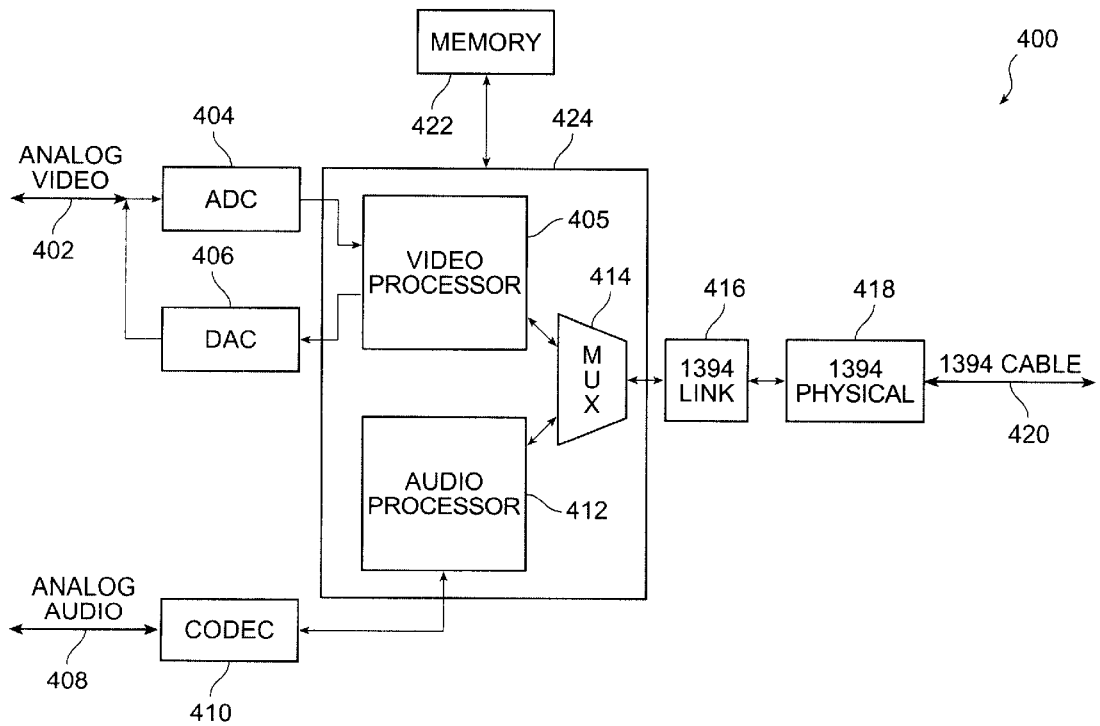
FIG. 4 illustrates a more detailed illustration of block 301 of FIG. 3.

FIG. 4 illustrates a system 400. The system 400 is a more detailed illustration of block 301 of FIG. 3. Analog video data is received at analog video node 402. The received data is then provided to an A/D converter 404 which converts the analog video data into a digital format. The digitized data from the A/D converter 404 is provided to a video processor 405 which performs video processing on the digitized video data. When outputting analog video data at the analog video node 402, a D/A converter 406 converts the digital analog video data from the video processor 405 into analog video data.

Audio data is received in analog format at an analog audio node 408. The analog audio data is provided to an audio converter 410. The audio converter 410 can convert analog audio data into digital format and vice versa. The audio converter 410 can be a Philips Electronics® UDA1344 or other suitable audio converter chips. The audio converter 410 is coupled to an audio processor 412. The audio processor 412 processes digital audio signals. The audio processor 412 can be any suitable audio processing chip such as digital signal processor (DSP) chips available from Texas Instruments. A multiplexer 414 multiplexes data from/to the video processor 405 and the audio processor 412. The multiplexer 414 is coupled to a link chip 416. The link chip 416 is preferably a purely digital chip and provides a link layer for communication in accordance with 1394 standard originally designed by Apple Computer, Inc.® Currently, the 1394 standard can provide a bandwidth of 100 Mb/sec, 200, 400, or 800 Mb/sec. Other brands of link chips can also be used such as Texas Instruments® TSB12LV42 and Phillips Electronics® PDI1394L21. The link chip 416 is coupled to physical layer 418 which provides a connection in accordance with the 1394 standard. The physical layer 418 is coupled to a cable 420 which is also designed in accordance with standard 1394. The cable 420 can also be an optical cable.

FIG. 4 also illustrates a memory 422 which can be any type of storage such as dynamic random access memory (DRAM), extended output DRAM (EDO DRAM), synchronous DRAM (SDRAM), video RAM (VRAM), static RAM (SRAM), and the like. The memory 422 provides storage for devices within system 400 including storage for functions performed within block 424, such as functions performed by the video processor 405 and the audio processor 412. Additionally, some elements of the system 400 can have their own local memory.

Figure 5:
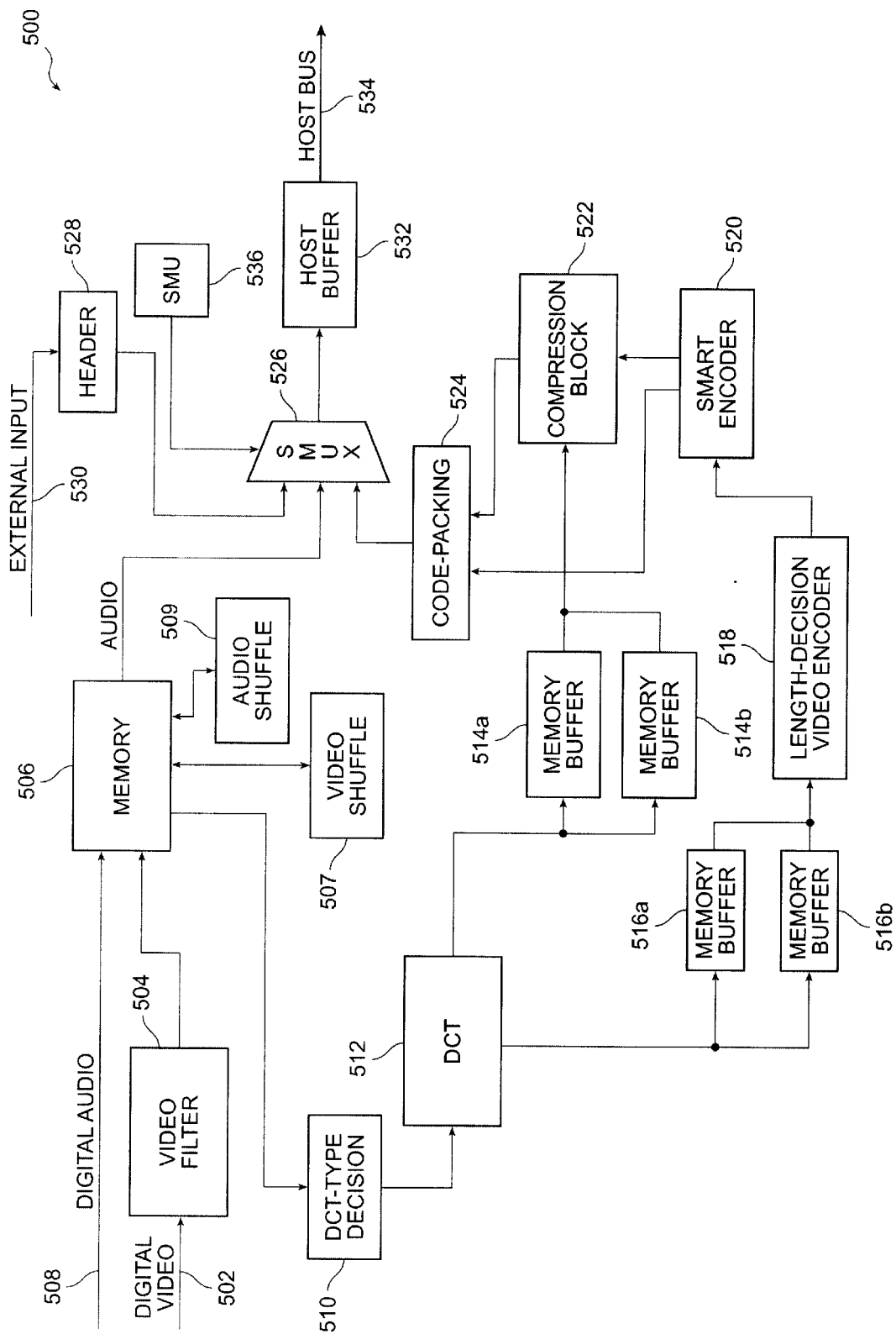
FIG. 5 illustrates a more detailed block diagram of the coding-compression block 306 of FIG. 3.

FIG. 5 illustrates a system 500. The system 500 is a more detailed block diagram of the coding-compression block 306 of FIG. 3. Digital video data is received at a video node 502. The received digital video data is preferably in 4:2:2 format, indicating four bytes of data for luminance (Y), two bytes of data for chrominance red (CR) and two bytes of data for chrominance blue (CB), respectively. The digital video data can be provided by any video decoder chip, such as Phillips Electronics® SAA7112. A video filter 504 performs filtering operations on the digital video data received at the video node 502. The filtering operations can include filtering for NTSC or PAL television system standards. For example, for NTSC the 4:2:2 format data can be filtered into 4:1:1 format. For PAL, the 4:2:2 format data can be filtered into 4:2:0 format data. Other filtering operations by the video filter 504 can include horizontal and vertical filtering to remove noise. The filtered video data from the video filter 504 can be stored in a memory 506. The video data can be arranged by a video shuffle block 507 to store the video data more efficiently in the memory 506. The memory 506 can also store digital audio data received at an audio node 508. An audio shuffle block 509 can arrange the audio data more efficiently in the memory 506. The memory 506 can be any type of storage such as DRAM, EDO DRAM, SDRAM, VRAM, SRAM, and the like. The memory 506 provides storage for devices within the system 500. Additionally, some elements of the system 500 can have their own local memory.

The video data stored in memory 506 can be retrieved by DCT-type decision block 510. The DCT-type decision block 510 can determine whether 8×8 or 2×4×8 type DCT should be performed on the retrieved video data. The retrieved video data is then provided to a DCT block 512 which is configured to perform the discrete cosine transformation on the retrieved data. The DCT block 512 will perform the DCT operation on the retrieved data in accordance with the DCT-type decision made by the DCT-decision block 510. The transformed data from the DCT block 512 is stored in memory buffers 514a–b and 516a–b. The memory buffers 514a–b can be identical. Similarly, the memory buffers 516a–b can be identical. The memory buffers 514a–b preferably store 1 k×20 bits of data. Memory buffers 516a–b preferably store 64×10 bits of data. Such a configuration will allow storage of one video segment in each of the memory buffers 514a–b. As detailed above, each video segment includes five (5) macro blocks and each macro block includes six (6) blocks of 8×8 pixels. Also, such a configuration will permit the memory buffers 516a–b to each store one 8×8 block of DCT transformed data. The memory buffers 514a–b and 516a–b will act as back and forth memory buffers, i.e., each time one memory buffer is filled, incoming data will be stored in the other memory buffer. Similarly, when data is read from one memory, the other memory buffer is being filled. For example, with respect to the memory buffers 516a–b, if the $0^{th}$ 8×8 block is stored in the memory buffer 516a, the $1^{st}$ block of the 8×8 block data is stored in the memory buffer 516b. Similarly, the $2_{nd}$ 8×8 block is stored in the memory buffer 516a and the $3^{rd}$ 8×8 block of data is stored in the memory buffer 516b. The 8×8 blocks stored in the memory buffers 516a–b are input into a length-decision video encoder 518. The length-decision video encoder 518 receives the frequency-domain pixel information transformed by the DCT block 512.

In contrast with other types of compression techniques, DV video encoding incorporates a few dynamically adjusted parameters to help maintain the video compression ratio at around 5:1. These parameters include the DCT-type (8×8 or 2×4×8), class number (0, 1, 2, and 3), Quantization or Q factor (0–15), and limited selection of quantization factor (powers of 2, simplifying implementation). These parameters are related to both the spatial-domain information (before DCT) and the frequency-domain information (after DCT). The almost constant compression ratio requirement can be maintained by determining the appropriate compression factors before any actual compression is performed. For example, the length-decision video encoder 518 determines the length information necessary for variable length coding (VLC).

There are sixteen possible Q factors (also know as "Q-numbers"). The length-decision video encoder 518 determines the length information for the received data from the memory buffers 516a–b based on five out of the sixteen possible Q factors. The reason for choosing only five of the sixteen possible Q-numbers is to reduce the number of computations and comparisons. The length-decision video encoder 518 computes the length for each of the Q-numbers, which is then used to look up an encoded length from an encoding table. Preferably, the five Q-numbers used are 0, 3, 7, 11, and 15 to provide a more dynamic range of values.

After the length decision, the data is input to a smart encoder 520. The smart encoder 520 determines which Q factors would provide the best compression based on the length decision for each block of 8×8 data. The selected Q-numbers are provided to compression block 522 for application to video segments stored in the memory buffers 514a–b. The compression block 522 can also include a code-decision video encoder for variable length coding. The smart encoder 520 also provides length information to a code packing block 524. The length information includes data about length of data stored in each macro block. The code packing block 524 receives the compressed data from compression block 522 and the macro block length information from smart encoder 520. The code packing block 524 arranges video data efficiently into a bitstream. The code packing block 524 is coupled to a system multiplexer 526. The system multiplexer 526 also receives audio data from the memory 506 and header information from a header block 528. The audio information can be from the audio node 508, and other sources of audio, such as audio overlays, editors, and the like. The header information can be input from outside the system. For example, external information such as close captioning, Tele-text, or different language subtitles, can be received from an external input 530.

The system multiplexer 526 arranges the outgoing data based on timing considerations to recreate real-time data in an appropriate order. The output of the system multiplexer 526 is coupled to a host buffer 532. The host buffer 532 is coupled to a host bus 534. The host buffer 532 ensures that data is buffered before it is provided to the host bus 534. Such a configuration will, for example, ensure that data will not be lost if the host bus is busy. The code packing block 524 can be coupled to the system multiplexer 526 through a pair of memory buffers similar to the memory buffers 514a–b (not shown). Such memory buffers would have a similar configuration, i.e., one would be read from while another is receiving data. The size of these memory buffers is preferably 385 bytes each. The system multiplexer unit 536 will provide control data to the system multiplexer 526 based on timing considerations to recreate real-time data flow in an appropriate order. Accordingly, the digital audio data received on the audio node 508 and the digital video data received on the video node 502 will be converted to DV format data by system 500 and output at node 534.

Figure 6:
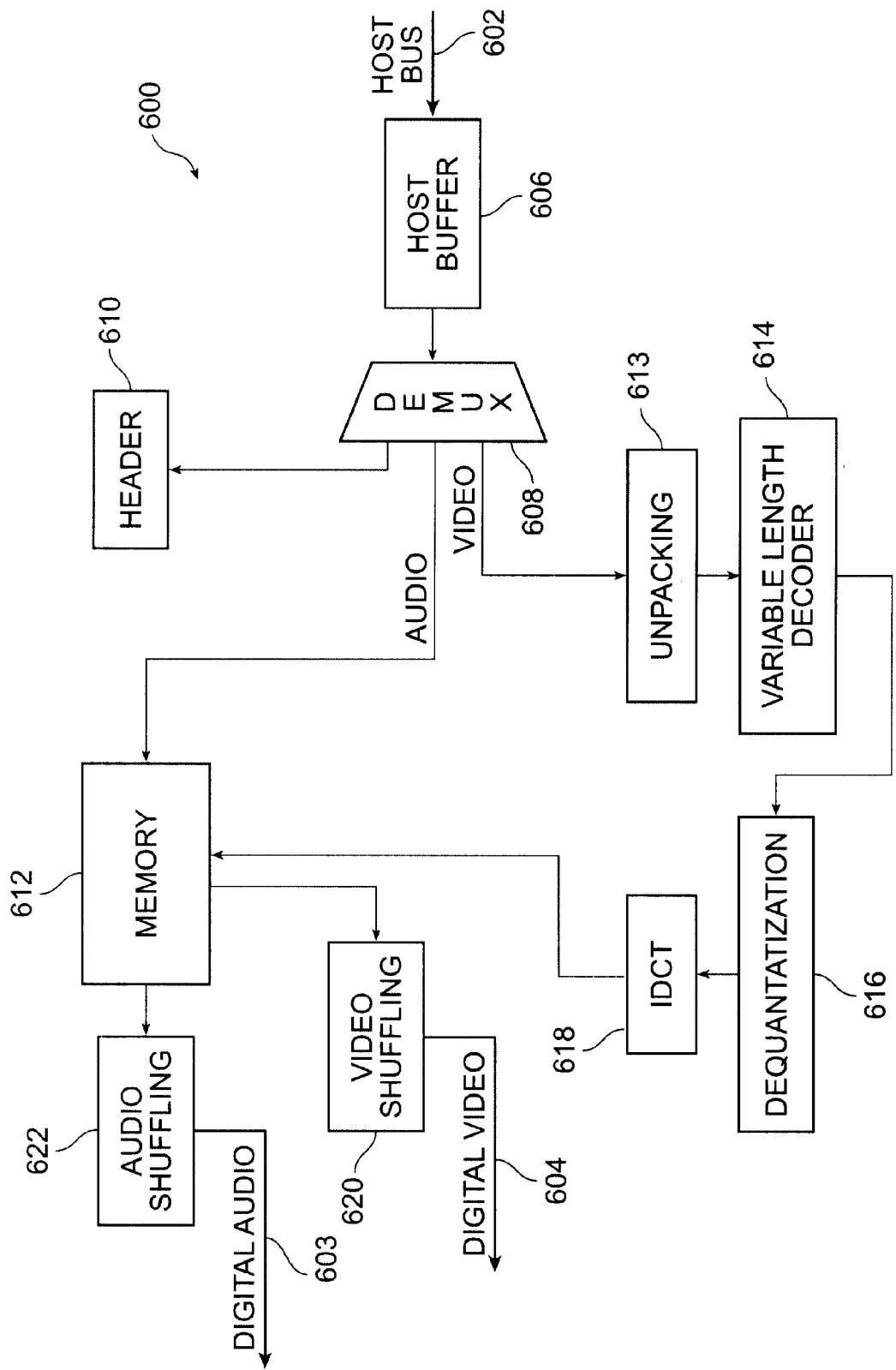
FIG. 6 illustrates a simplified block diagram of a system for converting DV data to digital data.

FIG. 6 illustrates a simplified block diagram of a system 600 for converting DV data received at a host node 602 to digital audio and video data which are respectively output at a digital audio node 602 and a digital video node 604. The DV data from the host node 602 is received by a host buffer 606. The host buffer 606 buffers the DV format data and provides the data to a demultiplexer 608. The demultiplexer 608 demultiplexes the DV data received from the host buffer 606 and provides header data to a header block 610, audio data to a memory 612, and video data to an unpacking block 613. The header data can be information such as close captioning, Tele-text, different language subtitles, and other data embedded in the DV format data. The memory 612 can be any type of storage such as DRAM, EDO DRAM, SDRAM, VRAM, SRAM, and the like. The memory 612 can also provide storage for devices within the system 600. Moreover, some elements of the system 600 can have their own local memory.

The unpacking block 613 is configured to convert the bitstream data to bitstreams for each video block and provide these unpacked blocks of data to a variable length decoder 614. The variable length decoder 614 decodes the DV video data in accordance with variable length decoding techniques. The output of variable length decoder 614 is coupled to a dequantization block 616 which dequantizes the DV bitstream in accordance with embedded dequantization factors. The dequantization block 616 is coupled to an inverse DCT (IDCT) block 618 which is configured to perform inverse discrete cosine transformation on the dequantized bitstream. The IDCT operation converts data from the frequency domain to the spatial domain. The spatial domain video data is then stored in the memory 612. A video shuffling block 620 retrieves the stored video data from the memory 612 and arranges the video data in an appropriate order if necessary. The video shuffling block 620 can also perform operations such as interpolation and filtering on the retrieved video data. For example, the video shuffling block 620 can perform a seven-tap horizontal filter which would convert a 4:1:1 format video data to a 4:2:2 format video data. Also, a three-tap vertical filter can be performed by the video shuffling block 620 to convert video data from 4:2:0 to 4:2:2 format. The output of the video shuffling block 620 can then be converted to analog format. At this stage, a chip such as Phillips Electronics® SAA7121 can be used to perform the conversion operations.

Similarly, an audio shuffling block 622 retrieves the stored audio data from the memory 612 and arranges the audio data in an appropriate order if necessary. The audio shuffling block 622 can also perform operations such as interpolation and filtering on the retrieved audio data. The output of the audio shuffling block 622 can then be converted to analog format. At this stage, a chip such as Phillips Electronics® UDA1344 can be used to perform the conversion operations.

Figures 1, 2:
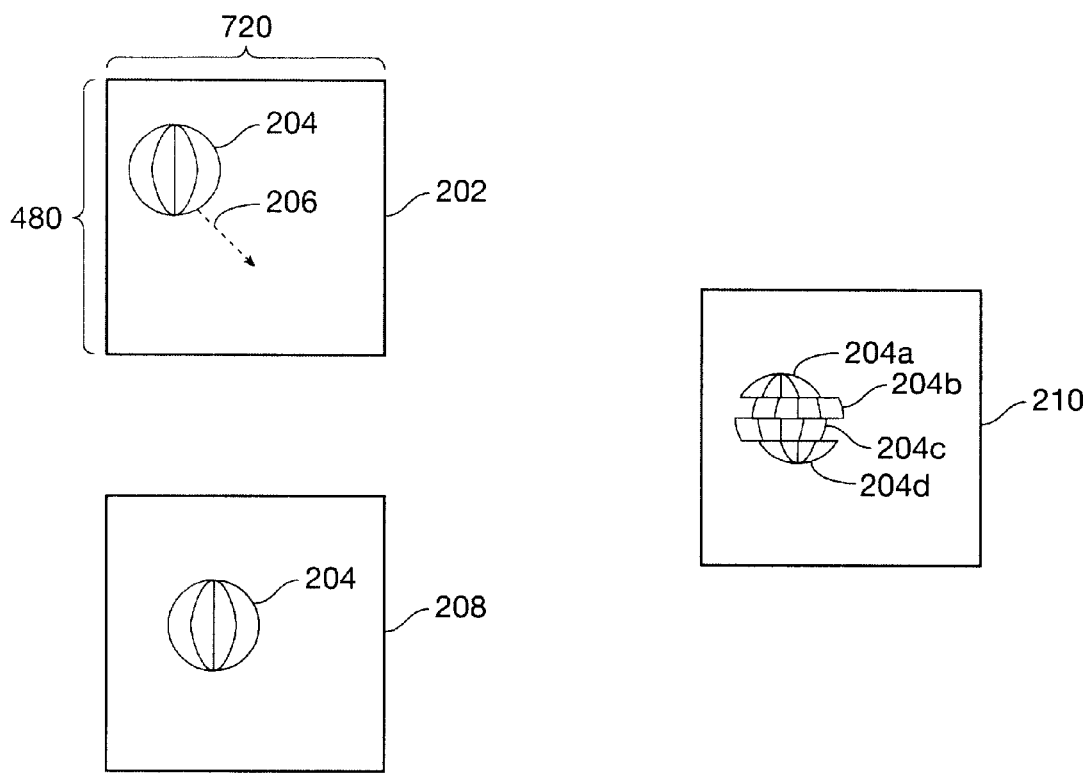
FIG. 1 illustrates two options for dividing an 8×8 image block in accordance with the prior art.
FIG. 2 illustrates an example of results of selecting a certain DCT-type transformation.
Figure 7A:
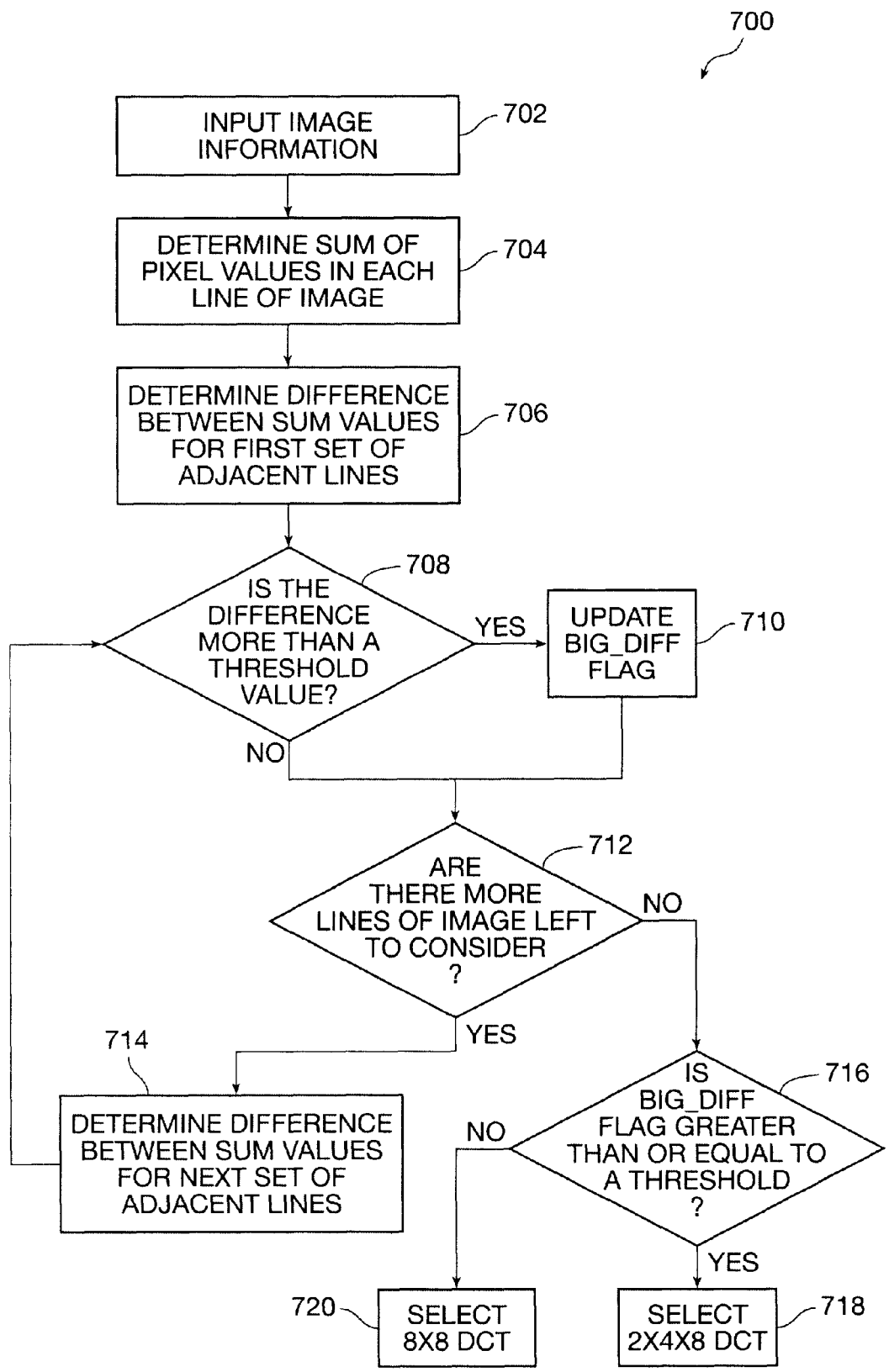
FIGS. 7A–C illustrate simplified block diagrams of methods in accordance with embodiments of the present invention.

FIG. 7A illustrates a simplified block diagram of a method 700 in accordance with an embodiment of the present invention. In step 702 image information is input. The image information is preferably in blocks of 8×8 pixels, but depending on the format used the image information can also be, for example, in blocks of 16×16. In step 704, the values of all pixels in each line of the image are summed. The line of image is the same as the row of pixels, such as discussed with respect to FIG. 1. In step 706, the difference between the sum values for the first set of adjacent lines is calculated. For example, the sum of all pixels in row 0 of box 102 in FIG. 1 is deducted from the sum value for row 1 of box 102 in FIG. 1. This calculated value in step 706 can be the absolute value of the difference between the two rows of pixels.

In a step 708, the calculated difference of the step 706 is compared with a threshold value. The threshold value is preferably about 400, but could be other values also. If the calculated difference in the step 706 is more than the threshold value, a variable BIG_DIFF is updated in a step 710. For example, a BIG_DIFF register may be incremented. In either case, the step 708 is followed by a step 712 in which it is determined whether there are more lines of the image block left to be considered. If there are more lines of the image to be considered, the difference between sum values for the next set of adjacent lines will be determined in step a 714.

For example, in the above example after considering rows 0 and 1, the step 714 will consider rows 1 and 2. After the step 714, steps 708 through 712 are repeated for all rows remaining in the image block inputted in the step 702. For example, for an 8×8 block of pixels, the steps 708, 710, and 712 can be repeated seven (7) times. In particular, each iteration will be repeated for all adjacent rows. For example, rows 0 and 1, 1 and 2, 2 and 3, etc. will be compared by the steps 708 through 712. Once the step 712 determines that there are no more lines of image left to be considered, a step 716 will determine whether BIG_DIFF is greater than or equal to a threshold value. The threshold value considered in step 716 is preferably about one. The step 716 can also be replaced by determining whether the value of BIG_DIFF is equal to a threshold value, such as one. If the criteria in step 716 is met, step 718 performs 2×4×8 DCT-type transformation on the image block. Otherwise, step 720 performs 8×8 DCT-type transformation on the image block. Even though a threshold value of about one is preferred, those with ordinary skill in the art would understand that other values such as two, three, etc., can also be used to determine whether the 2×4×8 DCT-type transformation should be performed on a given image. In addition to detecting movement, the method 700 will provide a more accurate determination as to the boundary of two objects within the given block of video data. This is possible in part because the method 700 performs its operations on a line-by-line basis.

Figure 7B:
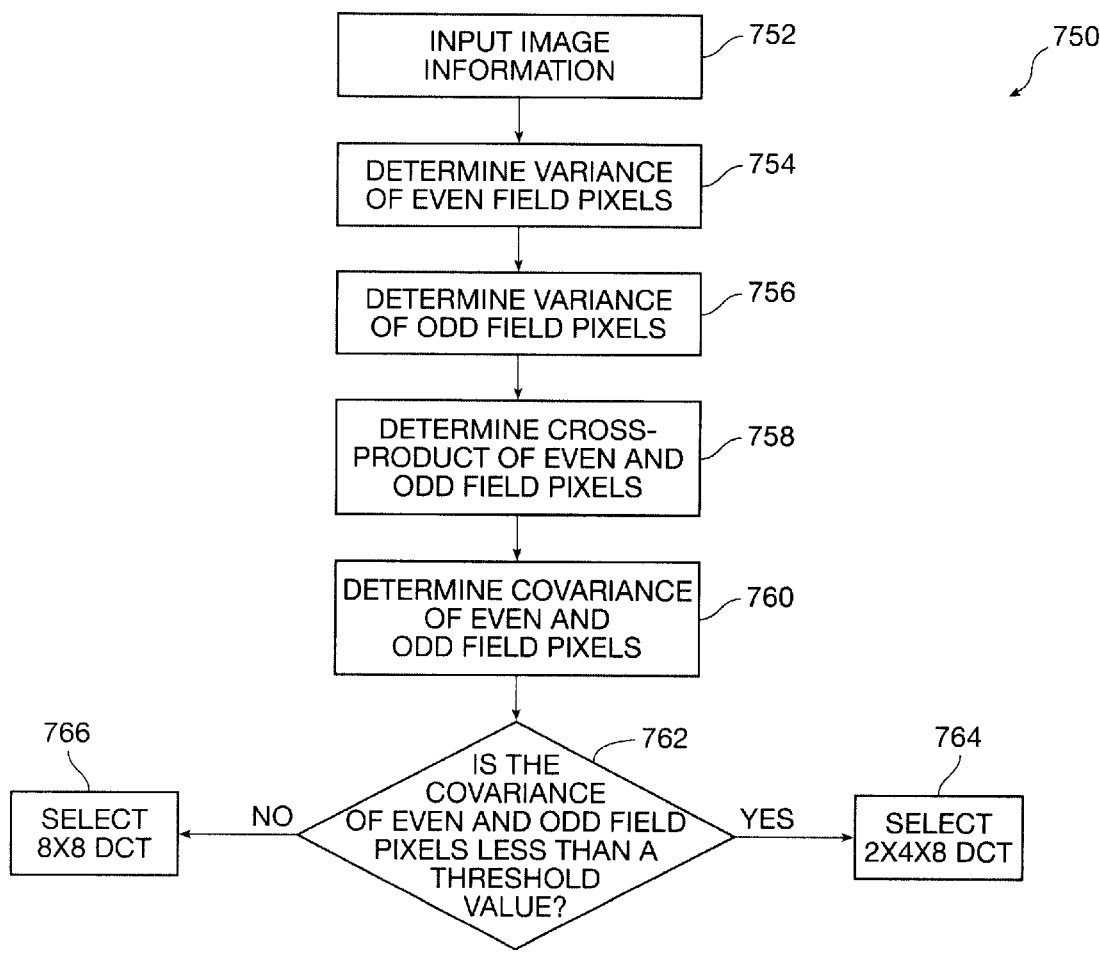

FIG. 7B illustrates a simplified block diagram of a method 750 in accordance with another embodiment of the present invention. In step 752, image information is input. The image information is preferably in blocks of 8×8 pixels, but depending on the format used the image information can also be, for example, in blocks of 16×16. In step 754, variance of all even field pixels is determined in accordance with the following formula:

$$VAR_{EVEN} = \frac{Even^2}{32} - \left(\frac{Even}{32}\right)^2 \quad \text{(Formula I)}$$

wherein $VAR_{EVEN}$ is the variance for all even field pixels, and Even is the sum of all pixels in the even field. For example, with respect to FIG. 1 Even is the sum of all pixels in box 104. In step 756, the variance of all odd field pixels is determined in accordance with the following formula:

$$VAR_{ODD} = \frac{Odd^2}{32} - \left(\frac{Odd}{32}\right)^2 \quad \text{(Formula II)}$$

wherein $VAR_{ODD}$ is the variance of all odd field pixels, and Odd is the sum of all pixel values within the odd field. For example, with respect to FIG. 1, Odd is the sum of all pixel values in box 106. In step 758, a cross product of even and odd field pixels is determined in accordance with the following formula:

$$Crossproduct = \frac{Even * Odd}{32} - \left(\frac{Even}{32} * \frac{Odd}{32}\right) \quad \text{(Formula III)}$$

wherein Crossproduct is the cross product of even and odd field pixels, as defined above. In step 760, a covariance of even and odd fields are calculated in accordance with the following formula:

$$Covar = \frac{Crossproduct}{\sqrt{Var_{ODD} * Var_{EVEN}}} \quad \text{(Formula IV)}$$

wherein Covar is the covariance of even and odd field pixels; Crossproduct, $VAR_{ODD}$, and $VAR_{EVEN}$ are as defined above. In step 762, the calculated covariance by step 760 is compared with a threshold value. The threshold value is preferably about 0.5. Those with ordinary skill in the art would, however, understand that even though covariance is compared with 0.5, it can also be compared with other values such as 0.4 or 0.6, depending on the type of image being analyzed. The value 0.5 is chosen because it provides a more dynamic range of features for different types of images. Lower values can be chosen if, for example, the image contains more moving objects. Similarly higher values can be chosen if, for example, the image contains less change in scenery.

If in step 762 it is determined that the calculated covariance is smaller than the threshold value, then 2×4×8 DCT-type transformation is performed in step 764. Otherwise, 8×8 DCT-type transformation is performed in step 766.

Figure 7C:
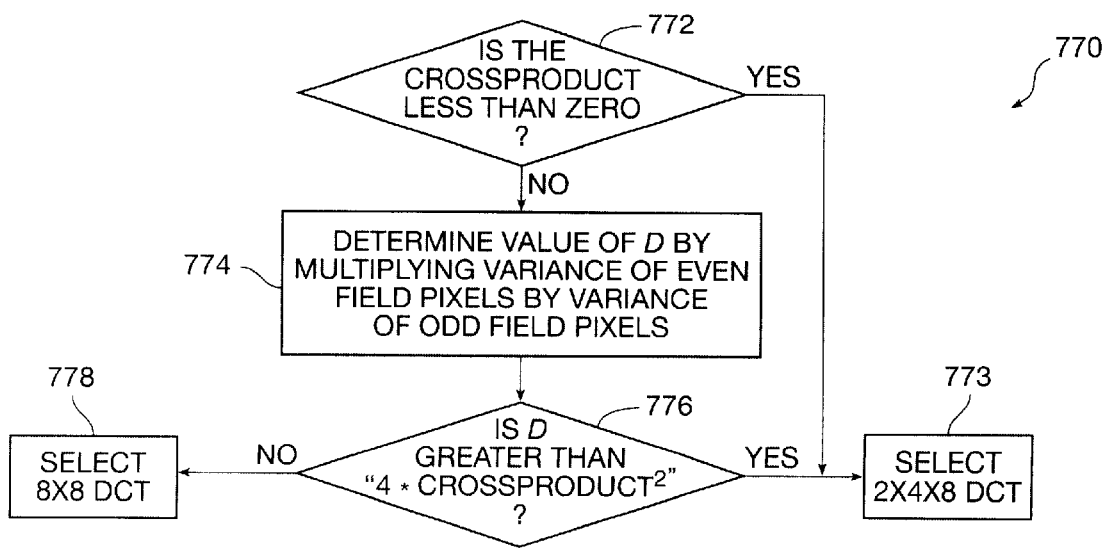

FIG. 7C illustrates a simplified block diagram of a method 770 in accordance with yet another embodiment of the present invention. The method 770 can be applied after performing steps 752, 754, 756, and 758 of FIG. 7B. But because division and square root operations take more gate counts to implement, the method 770 utilizes a novel method for deciding when to use 2×4×8 DCT-type transformation. For example, the last formula could be simplified by substituting a variable D as follows:

$$D = VAR_{EVEN} * VAR_{ODD} \quad \text{(Formula V)}$$

wherein $VAR_{EVEN}$ and $VAR_{ODD}$ are as defined above. If we substitute D in Formula IV for its equivalent expression, it will result in the following:

$$Covar = \frac{Crossproduct}{\sqrt{D}} \quad \text{(Formula VI)}$$

The above formula can be further simplified as follows for a value of 0.5 substituted for Covar:

$$(0.5)^2 > \frac{CrossProduct^2}{D} \quad \text{(Formula VII)}$$

Then, the following holds:

$$D > \text{Cross Product}^2 * 4 \quad \text{(Formula VIII)}$$

In step 772, the calculated cross product is compared with zero. If the calculated cross product is less than zero, 2×4×8 DCT-type transformation will be performed in step 773. Otherwise, step 774 determines the value of D by multiplying the variance of even field pixels by the variance of odd field pixels, as detailed in Formula V. In step 776, the result of Formula VIII is determined by comparing D with (Crossproduct$^2$*4). If D is greater, the 2×4×8 DCT-type transformation will be selected in the step 773. Otherwise, the 8×8 DCT-type transformation will be selected in step 778.

Figure 8A:
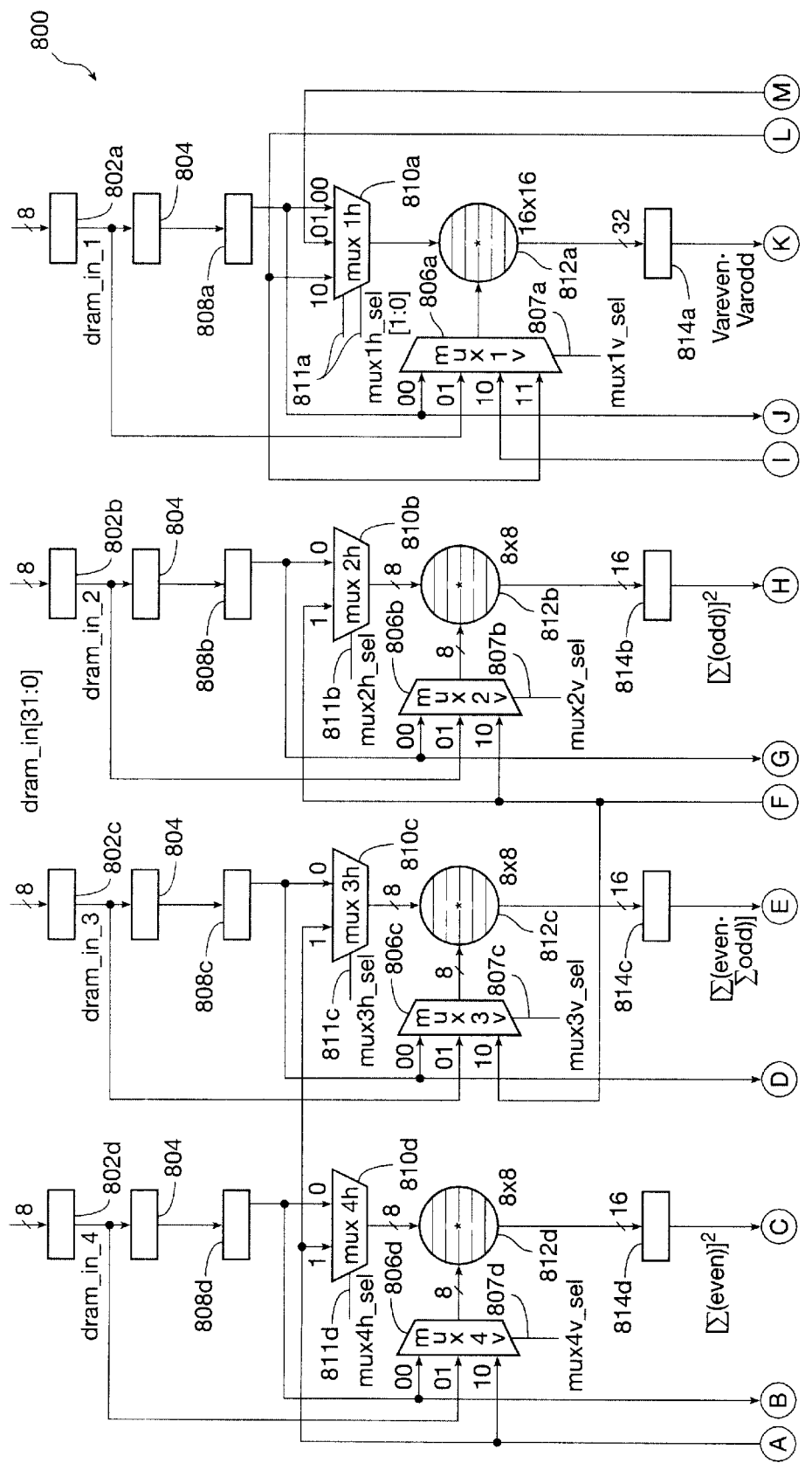
FIGS. 8A and 8B illustrate a simplified block diagram of a pipelined system in accordance with an embodiment of the present invention.
Figure 8B:
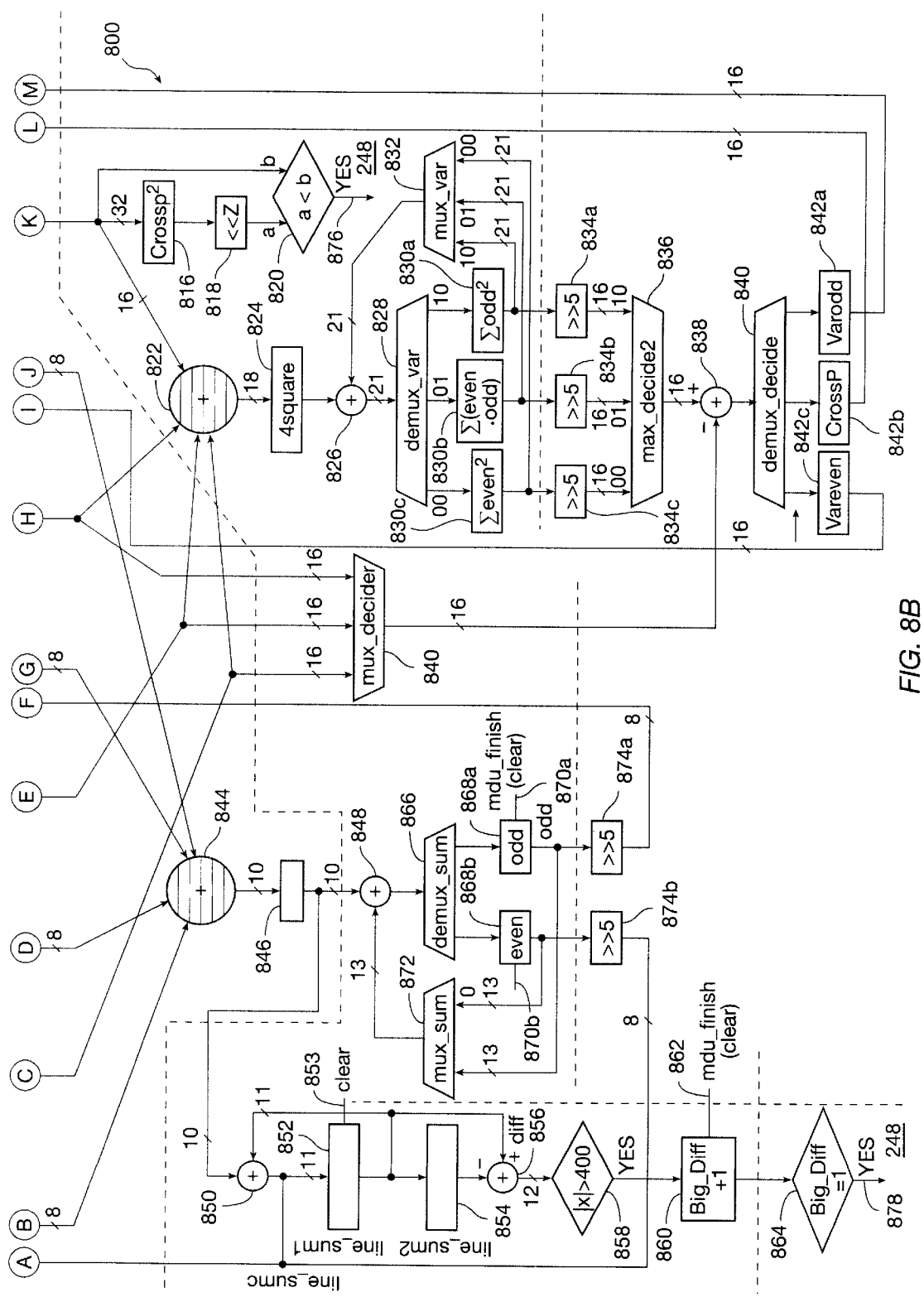

FIGS. 8A and 8B illustrate a simplified block diagram of a pipelined system 800 in accordance with an embodiment of the present invention. The pipelined system 800 determines which DCT-type transformation should be used on an image in accordance with an embodiment of the present invention. In an embodiment, the pipelined system 800 can be substituted for the DCT-type decision block 510 of FIG. 5. In FIG. 8A, registers 802a–d receive data from a storage such as DRAM, or other appropriate types of storage.

Each of the registers 802a–d can receive eight bits of data in each clock cycle. The outputs of the registers 802a–d are coupled to registers 804 and vertical multiplexers 806a–d. The registers 804 can also be eight bits wide. The output of the registers 804 are connected to registers 808a–d, which can also be eight bits wide. The registers 808a–d are coupled to horizontal multiplexers 810a–d, respectively. The horizontal multiplexers 810a–d and vertical multiplexers 806a–d are connected to multipliers 812a–d, respectively. The multiplier 812b–d can be 8×8 multipliers. The multiplier 812a receives its input from the horizontal multiplexer 810a and vertical multiplexer 806a. The multiplier 813a is a 16×16 multiplier. The multipliers 812a–d multiply the selected inputs by their respective vertical and horizontal multiplexers to generate outputs for registers 814a–d. The horizontal multiplexers 810a–d receive selection inputs at node 811a–d, respectively. The selection inputs at the nodes 811a–d determine which one of the inputs to the horizontal multiplexers 810a–d are provided to the multipliers 812a–d. The vertical multiplexer 806a–d receive their selection signals at nodes 807a–d, respectively. The selection inputs at the nodes 807a–d determine which one of the inputs to the vertical multiplexers 806a–d are provided to the multipliers 812a–d. The vertical multiplexers 806a–d also receive inputs from the registers 808a–d. The registers 802a–d read image information into the pipelined system 800 in each clock cycle and as a result eight pixels can be input in two cycles.

The register 814a is coupled to a register 816, both of which can be thirty-two bits wide. Output of the register 816 is coupled to a shift register 818 which is configured to shift the output of the register 816 left by two, thereby multiplying that output by four (4). Then the output of the shift register 818 is compared with the output of the register 814a by a comparator 820. If the output of the shift register 818 is smaller, then the 2×4×8 DCT-type transformation will be performed.

Concurrently, the output of the registers 814a–d are provided to an adder 822 which provides a result to a register 824. The output of the adder 822 is eighteen bits wide. The inputs to adder 822 can be sixteen bits wide each. Even though the register 814a is thirty-two bits wide, only a sixteen bit output can be provided to adder 822 because the data received by the adder 822 from the register 814a is 16 bits wide. The output of the register 824 is coupled to an adder 826. The output of the adder 826 is twenty-one bits wide and is coupled to a demultiplexer 828. The demultiplexer 828 provides its selected output to registers 830a–c. The outputs of the register 830a–c are also twenty-one bits wide and are fed to a multiplexer 832. The multiplexer 832 provides a twenty-one bit wide input back to the adder 826. The adder 826 sums its inputs from the register 824 and the multiplexer 832. The register 830a–c also provide their stored values to shift registers 834a–c. The shift registers 834a–c shift the stored values to right by five places. As a result, the shift registers 834a–c divide the stored values by thirty-two.

The outputs of the shift register 834a–c are sixteen bits wide and coupled to a multiplexer 836 which provides its output to an adder 838. The adder 838 also receives an input from a multiplexer 840. The multiplexer 840 receives its inputs from the register 814b–d, which are sixteen bits wide each. The adder 838 deducts the output of the multiplexer 840, which is also sixteen bits wide, from the output of the multiplexer 836. The output of the adder 838 is coupled to the demultiplexer 840 which provides its selected outputs to registers 842a–c. The output of the register 842a is fed back to the horizontal multiplexer 810a. The output of the register of 842b is fed back to the horizontal multiplexer 810a and vertical multiplexer 806a. The output of the register 842c is coupled to the vertical multiplexer 806a.

Concurrently, in the lower left-hand corner of the pipelined system 800 shown in FIG. 8B, an adder 844 receives eight-bit wide inputs from the registers 808a–d. The adder 844 provides a ten-bit output to a register 846. The ten-bit wide output of the register 846 is coupled to adders 848 and 850. The output of the adder 850 is eleven bits wide and is coupled to a register 852. The output of the register 852 is fed back to the adder 850 and register 854. The register 852 can also receive a clear signal to reset its contents at node 853. The output of the register 854 is coupled to an adder 856 which also receives the output of the register 852. The adder 856 deducts the output of the register 854 from the output of the register 852 and provides the result which is twelve bits wide to a comparator 858. The comparator 858 compares the absolute value of the output of the adder 856 to a threshold value which is preferably about four hundred (400). If the absolute value is greater than the threshold, a register 860 is updated. Even though a value of about 400 is preferred, those with ordinary skill in the art would understand that other threshold values such as 350, 380, 405, 410, etc., can also be used for the threshold value.

The register 860 can be reset by a signal at node 862. A comparator 864 compares the stored value of the register 860 with a second threshold value, preferably about one. If the output of register 860 is greater or equal to the second threshold value, the 2×4×8 DCT-type transformation will be used to perform the DCT operations. The comparator 864 can also determine whether the stored value of the register 860 is equal to the second threshold value. Even though a value of one is preferred, those with ordinary skill in the art would understand that other threshold values such as two, three, etc., can also be used to determine whether the 2×4×8 DCT-type transformation should be performed on a given image.

The output of adder 848 is also provided to a demultiplexer 866 which provides its selected outputs to registers 868a–b. Both registers 868a–b can also be reset with signals at nodes 870a–b, respectively. The output of the registers 868a–b which are thirteen bits wide are coupled to a multiplexer 872. The output of multiplexer 872 which is also thirteen bits wide is fed back to the adder 848. As a result, the adder 848 sums the output of the register 846 and the multiplexer 872. The outputs of registers 868a–b are also provided to shift registers 874a–b. The output of the shift register 874a is coupled to the horizontal multiplexer 810b and the vertical multiplexers 806b–c. The output of the shift register 874b is coupled to the vertical multiplexer 806d and the horizontal multiplexers 810c–d. The shift registers 874a–b shift the outputs of the registers 868a–b to right by five. Accordingly, the shift registers 874a–b divide the outputs of the registers 868a–b by thirty-two (32).

In accordance with the pipelined system 800 described above, multiple values are calculated concurrently. The pipelined system 800 also utilizes techniques to improve performance, simplify implementation, lower the cost of implementation, and the like by avoiding use of dividers and lowering the number of multipliers required to perform the requisite computations.

Moreover, the pipelined system 800 concurrently makes decisions at nodes 876 and 878 about the DCT-type transformation to utilize for a given 8×8 block of data. For example, the horizontal multiplexers 810a–d and vertical multiplexers 806a–d can select appropriate inputs which are then provided to the multipliers 812a–d. The results of the multiplication operations are used by the downstream circuitry to calculate the Crossproduct and D values as discussed above with respect to FIGS. 7B–C and Formulas I–VIII. For example, as indicated in FIG. 8B, the registers 868a–b will store the sum of all pixel values in the odd and even fields of the video block being considered, respectively. These sum values are then utilized by the multipliers 812b–d to provide Odde$^2$, Odd*Even, and Even$^2$, respectively. The calculated values are then used by the shift registers 834a–c and the adder 838 to provide VAR$_{ODD}$, Crossproduct, and VAR$_{EVEN}$ in the registers 842a–c, respectively. These values are then utilized by the comparator 820 to determine whether the 2×4×8 DCT-type transformation should be performed on the present video block.

Moreover, the pipelined system 800 also calculates the difference between adjacent rows of the pixels to determine the appropriate DCT-type transformation for the given block of data. In particular, as detailed above, the row summation operation will be performed by the adders in the pipelined system 800, such as 844 and 850. The calculated sum of adjacent rows of pixels are then deducted from each other by the adder 865 to calculate the difference, such as discussed with respect to FIG. 7A. The calculated difference is then compared to a threshold value by the comparator 858. If the criterion is met, then the register 860 will be updates. The register 860 can contain the value of BIG_DIFF which is discussed above with respect to FIG. 7A. The comparator 864 compares the value of BIG_DIFF stored in the register 860 with the second threshold. If this criterion is met, the 2×4×8 DCT-type transformation will be performed on the present video block.

The present invention has been implemented with a commercially available 0.35 μm CMOS process. The 8×8 block of video data is input in thirty-two cycles (32). The decision of which DCT-type transformation should be applied to the input block is made in seventeen (17) cycles.

As will be understood by those with ordinary skill in the art, the present invention may be embodied in other specific forms without departing from the spirit or essential characteristics thereof For example, the techniques of the present invention can also be applied to other compression systems such as the standards specified by the Joint Photographic Experts Group (JPEG), Motion Picture Experts Group (MPEG), or MPEGII. These standards are included by reference herein, in their entirety and for all purposes.

Alternately, the techniques of the present invention can be implemented in a computer system. For example, the pipelined system 800 can be implemented on a peripheral component interconnect (PCI) card. The PCI card can be installed onto the PCI bus of a personal computer. Also, other bus technologies such as NUBUS, ISA, EISA, Universal Serial Bus (USB), 1394 bus, and Accelerated Graphics Port (AGP) can also be utilized. Also, the techniques of the present invention can be implemented by utilizing the available routines and features such as caching, new instruction sets, and single instruction multiple data (SIMD) tools which are provided by Intel® Corporation's MMX™ technology, Advance Micro Device,® Inc.'s 3DNow!™ technology, and their equivalents. Furthermore, the techniques of the present invention can be applied to blocks of data other than 8×8. For example, the techniques of the present invention can be applied to 16×16 blocks of data, and the like. Additionally, even though the techniques of the present invention have been discussed with respect to DCT transformation other types of transformations can also be utilized such as wavelet transform and vector quantization (VQ). Accordingly, for an understanding of the scope of the invention, reference should be made to the appended claims.

What is claimed is:

1. An apparatus for determining whether to apply a transformation to a first portion and a second portion of an image individually, the image being formed by pixels, the apparatus comprising:

a first adder configured to calculate a first sum and a second sum, the first sum being the sum of pixel values for all pixels in the first portion of the image, the first portion of the image includes even rows of pixels, the second sum being the sum of pixel values for all pixels in the second portion of the image, the second portion of the image includes odd rows of pixels, each even and odd row of pixels has more than one pixel, the pixels of the first portion being substantially adjacent to the pixels of the second portion of the image;

a second adder coupled to the first adder, the second adder configured to receive the first sum and the second sum, the second adder further configured to determine a difference between the first sum and the second sum; and a first comparator coupled to the second adder and configured to compare the determined difference with a first threshold value, the apparatus configured to apply the transformation to the first portion of the image and the second portion of the image individually if the determined difference is higher than the first threshold value.

2. The apparatus of claim 1 wherein the first threshold value is about 400.

3. The apparatus of claim 1 wherein the transformation is selected from a group consisting of discrete cosine transform, wavelet transform, and vector quantization.

4. A card configured to be coupled with a computer bus wherein the card includes the apparatus of claim 1.

5. The card of claim 4 wherein the computer bus is selected from a group consisting of PCI, NUBUS, ISA, EISA, USB, and AGP.

6. An apparatus for determining whether to apply a transformation to a first portion and a second portion of an image individually, the image being formed by pixels, the apparatus comprising:

a first adder configured to calculate a first sum and a second sum, the first sum being the sum of pixel values for all pixels in the first portion of the image, the second sum being the sum of pixel values for all pixels in the second portion of the image, the pixels of the first portion being substantially adjacent to the pixels of the second portion of the image;

a second adder coupled to the first adder, the second adder configured to receive the first sum and the second sum, the second adder further configured to determine a difference between the first sum and the second sum;

a first comparator coupled to the second adder and configured to compare the determined difference with a first threshold value, the apparatus configured to apply the transformation to the first portion of the image and the second portion of the image individually if the determined difference is higher than the first threshold value;

a shifter coupled to the first adder, the shifter configured to shift the first sum and the second sum to right by a shifting variable;

a multiplier coupled to the first adder and the shifter, the multiplier configured to multiply the shifted first sum and the shifted second sum to determine a product of shifted sums, the multiplier further configured to multiply the first sum and the second sum to determine a sum product, the multiplier further configured to multiply the first sum and the second sum by themselves to respectively determine a first sum squared and a second sum squared, the shifter further configured to shift the sum product to right by the shifting variable, the shifter further configured to shift the first sum squared and the second sum squared to right by the shifting variable;

a third adder coupled to the shifter and the multiplier, the third adder configured to determine a cross product of the first portion of the image and the second portion of the image by deducting the product of shifted sums from the shifted sum product; and a second comparator coupled to the third adder, the second comparator configured to compare the determined cross product with a second threshold value, the apparatus configured to apply the transformation to the first portion of the image and the second portion of the image individually if the determined cross product is less than the second threshold value.

7. The apparatus of claim 6 wherein in the second threshold value is about 0.

8. The apparatus of claim 6 wherein the shifting variable is about 5.

9. An apparatus for determining whether to apply a transformation to a first portion and a second portion of an image individually, the image being formed by pixels, the apparatus comprising:

a first adder configured to calculate a first sum and a second sum, the first sum being the sum of pixel values for all pixels in the first portion of the image, the second sum being the sum of pixel values for all pixels in the second portion of the image, the pixels of the first portion being substantially adjacent to the pixels of the second portion of the image;

a second adder coupled to the first adder, the second adder configured to receive the first sum and the second sum, the second adder further configured to determine a difference between the first sum and the second sum;

a first comparator coupled to the second adder and configured to compare the determined difference with a first threshold value, the apparatus configured to apply the transformation to the first portion of the image and the second portion of the image individually if the determined difference is higher than the first threshold value;

a shifter coupled to the first adder, the shifter configured to shift the first sum and the second sum to right by a first shifting variable;

a multiplier coupled to the first adder and the shifter, the multiplier configured to multiply the shifted first sum and the shifted second sum to determine a product of shifted sums, the multiplier further configured to multiply the first sum and the second sum to determine a sum product, the multiplier further configured to multiply the shifted first sum and the shifted second sum by themselves to respectively determine a shifted first sum squared and a shifted second sum squared, the multiplier further configured to multiply the first sum and the second sum by themselves to respectively determine a first sum squared and a second sum squared, the shifter further configured to shift the sum product to right by the first shifting variable, the shifter further configured to shift the first sum squared and the second sum squared to right by the first shifting variable to respectively determine a first sum squared shifted and a second sum squared shifted;

a third adder coupled to the shifter and the multiplier, the third adder configured to determine a cross product of the first portion of the image and the second portion of the image by deducting the product of shifted sums from the shifted sum product, the third adder configured to determine a first variance by deducting the shifted first sum squared from the first sum squared shifted and determine a second variance by deducting the shifted second sum squared from the second sum squared shifted, the multiplier further configured to determine a variance product by multiplying the first and second variances, the multiplier further configured to determine a cross product squared value by multiplying the cross product by itself and shifting the multiplied cross product to left by a second shifting variable; and a second comparator coupled to the multiplier, the second comparator configured to compare the cross product squared value with the variance product, the apparatus configured to apply the transformation to the first portion of the image and the second portion of the image individually if the cross product squared value is less than the variance product.

10. The apparatus of claim 9 wherein the first shifting variable is about 5.

11. The apparatus of claim 9 wherein the second shifting variable is about 2.

* * * * *